(12) United States Patent
Zhao et al.

(10) Patent No.: US 9,928,427 B2
(45) Date of Patent: Mar. 27, 2018

(54) VISION-BASED WET ROAD SURFACE CONDITION DETECTION USING TIRE REARWARD SPLASH

(71) Applicant: GM GLOBAL TECHNOLOGY OPERATIONS LLC, Detroit, MI (US)

(72) Inventors: Qingrong Zhao, Madison Heights, MI (US); Qi Zhang, Sterling Heights, MI (US); Jinsong Wang, Troy, MI (US); Bakhtiar B. Litkouhi, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 47 days.

(21) Appl. No.: 14/957,953

(22) Filed: Dec. 3, 2015

(65) Prior Publication Data

US 2017/0161570 A1   Jun. 8, 2017

(51) Int. Cl.
*G06K 9/00* (2006.01)
*G06T 7/00* (2017.01)
(Continued)

(52) U.S. Cl.
CPC ......... *G06K 9/00798* (2013.01); *B60W 40/06* (2013.01); *G06K 9/3233* (2013.01); *G06K 9/4604* (2013.01); *G06K 9/4647* (2013.01); *G06K 9/6227* (2013.01); *G06T 7/0085* (2013.01); *G06T 7/403* (2013.01); *H04N 7/183* (2013.01); *B60W 2420/42* (2013.01); *B60W 2550/14* (2013.01); *B60W 2710/06* (2013.01); *B60W 2710/18* (2013.01); *B60W 2720/40* (2013.01); *B60W 2750/40* (2013.01);
(Continued)

(58) Field of Classification Search
CPC ............. G06K 9/00798; G06K 9/3233; G06K 9/4604; G06K 9/4647; G06K 9/6227; B60W 40/06; B60W 2420/42; B60W 2710/18; B60W 2720/40; B60W 2750/40; G06T 7/0085; G06T 7/403; G06T 2207/20024; G06T 2207/20081; G06T 2207/30256; H04N 7/183
See application file for complete search history.

(56) References Cited

U.S. PATENT DOCUMENTS

2010/0121577 A1 *  5/2010  Zhang ................ G06K 9/00805
                                                         701/301
2011/0109448 A1 *  5/2011  Browne ................... B60Q 9/00
                                                         340/438

(Continued)

*Primary Examiner* — Jerrah Edwards
*Assistant Examiner* — Mathew Franklin Gordon
(74) *Attorney, Agent, or Firm* — Quinn IP Law

(57) ABSTRACT

A method for determining a wet surface condition of a road. An image of a road surface is captured by an image capture device of the host vehicle. The image capture device is mounted on a side of the host vehicle and captures an image in a downward direction. A region of interest rearward of the wheel of the host vehicle is identified in the captured image by a processor. The region of interest is representative of where rearward splash as generated by the wheel occurs. A determination is made whether precipitation is present in the region of interest by applying a filter to the image. A wet road surface signal is generated in response to the identification of precipitation in the region of interest.

18 Claims, 7 Drawing Sheets

(51) Int. Cl.
  *B60W 40/06* (2012.01)
  *G06K 9/62* (2006.01)
  *G06K 9/46* (2006.01)
  *H04N 7/18* (2006.01)
  *G06K 9/32* (2006.01)
  *G06T 7/40* (2017.01)

(52) U.S. Cl.
  CPC .............. *G06T 2207/20024* (2013.01); *G06T 2207/20081* (2013.01); *G06T 2207/30256* (2013.01)

(56) References Cited

U.S. PATENT DOCUMENTS

| | | | |
|---|---|---|---|
| 2013/0202200 A1* | 8/2013 | Ribnick | G06K 9/6221 382/160 |
| 2014/0081507 A1* | 3/2014 | Urmson | B60W 40/06 701/28 |
| 2014/0247352 A1* | 9/2014 | Rathi | B60R 1/00 348/148 |

* cited by examiner

VISION-BASED WET ROAD SURFACE CONDITION DETECTION USING TIRE REARWARD SPLASH

BACKGROUND OF INVENTION

An embodiment relates generally to detection of a wet road surface using detection of tire rearward splash.

Precipitation on a driving surface causes several different issues for a vehicle. For example, water on a road reduces the coefficient of friction between the tires of the vehicle and the surface of the road resulting in vehicle stability issues. Detection of precipitation on a road of travel is typically determined by a host vehicle sensing for precipitation on the road utilizing some sensing operation which occurs when the precipitation is already impacting the vehicle operation such as detecting wheel slip. As a result, the vehicle must monitor its own operating conditions (e.g., wheel slip) against dry pavement operating conditions for determining whether precipitation is present. As a result, such systems may wait for such a condition to occur or may introduce excitations to the vehicle for determining whether the condition is present (e.g., generating sudden acceleration to the driven wheels for invoking wheel slip if the precipitation is present).

SUMMARY OF INVENTION

An advantage of an embodiment is the detection of water on a road using a vision-based imaging device that identifies precipitation dispersed from the surface of the road by its own vehicle wheel. The technique described herein requires no excitations from the vehicle or driver for initiating a determination of whether precipitation is present. Rather, precipitation is determined in response to monitoring splash rearward of a vehicle wheel. The technique preferably captures an image and detects edges within the image that distinguishes between splash caused by the tires of its own vehicle kicking up the precipitation and a non splashed region (i.e. undisturbed precipitation on the road surface). A trained database such as a classifier is generated offline and then is implemented within the vehicle for readily determining whether precipitation is present utilizing the trained classifier.

An embodiment contemplates a method for determining a wet surface condition of a road. An image of a road surface is captured by an image capture device of the host vehicle. The image capture device is mounted on a side of the host vehicle and capturing an image in a downward direction. A region of interest rearward of the wheel of the host vehicle is identified in the captured image, by a processor. The region of interest is representative of where rearward splash as generated by the wheel occurs. A determination is made whether precipitation is present in the region of interest. A wet road surface signal is generated in response to the identification of precipitation in the region of interest.

DETAILED DESCRIPTION

Figure 1:
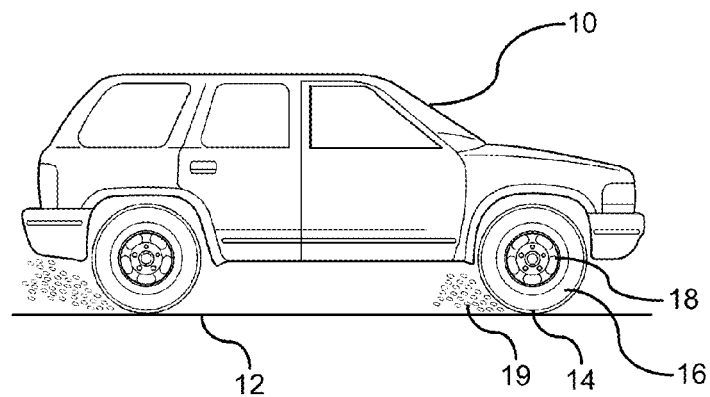
FIG. 1 is an exemplary perspective view of a vehicle scene on a wet surface captured by a camera.

There is shown in FIG. 1, a vehicle 10 traveling along a vehicle road 12. Precipitation 19 shown disposed on the vehicle road 12 is often displaced by the vehicle wheel 14 and tires 16 mounted on a rim 18 of the wheel 14 as the tires rotate over the wet surface on the vehicle road 12. It is often advantageous to know when the vehicle will be traveling along a wet vehicle road 12 so that issues resulting from precipitation, such as loss of traction or engine degradation resulting from water entering exterior air intake vents can be negated or at least mitigated.

Precipitation 19 on the vehicle road 12 can result in a reduction of traction when driving on the wet road surface. The precipitation 19 disposed on the vehicle road 12 lowers the coefficient of friction between the vehicle tires and the vehicle road 12. As a result, traction between the vehicle tires and the vehicle road 12 is lowered. Loss of traction can be mitigated by various mitigation techniques that include, but are not limited to, warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of cruise control functionality while precipitation is detected; or notification to the driver to maintain a greater stopping distance to a lead vehicle. It should be understood that the embodiments described herein can be applied to other types of systems aside from automobiles where detection of a wet road surface condition is desired. Examples of vehicles that are other than automobiles that can utilize this system include, but are not limited to, rail systems, planes, off-road sport vehicles, robotic vehicles, motorcycles, bicycles, farm equipment, and construction equipment.

Figure 3:
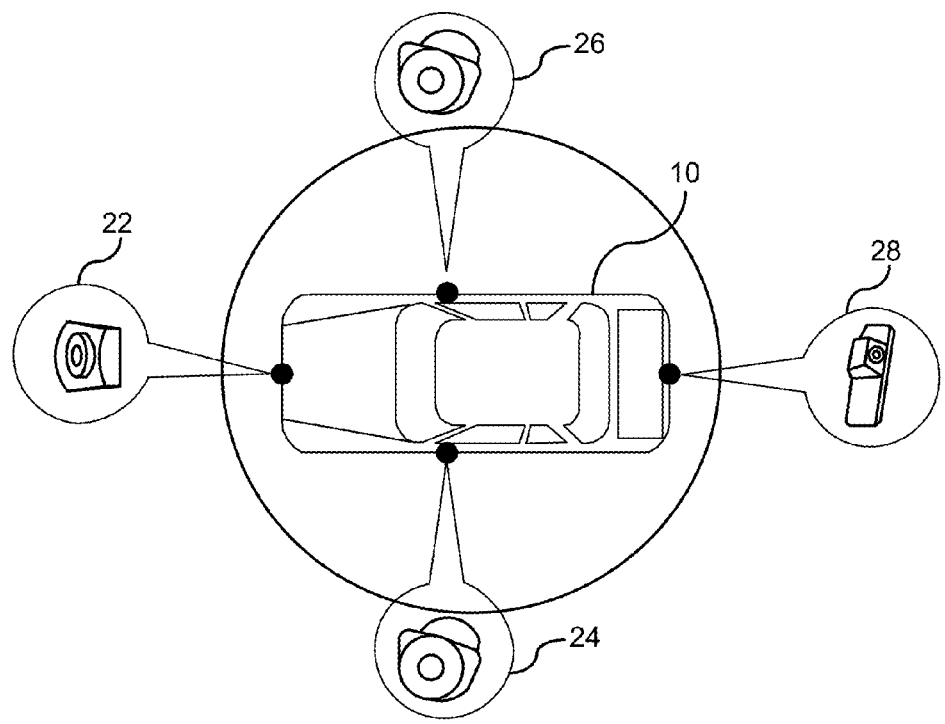
FIG. 3 is an exemplary perspective view of a vehicle surround having surround view coverage.
Figure 2:
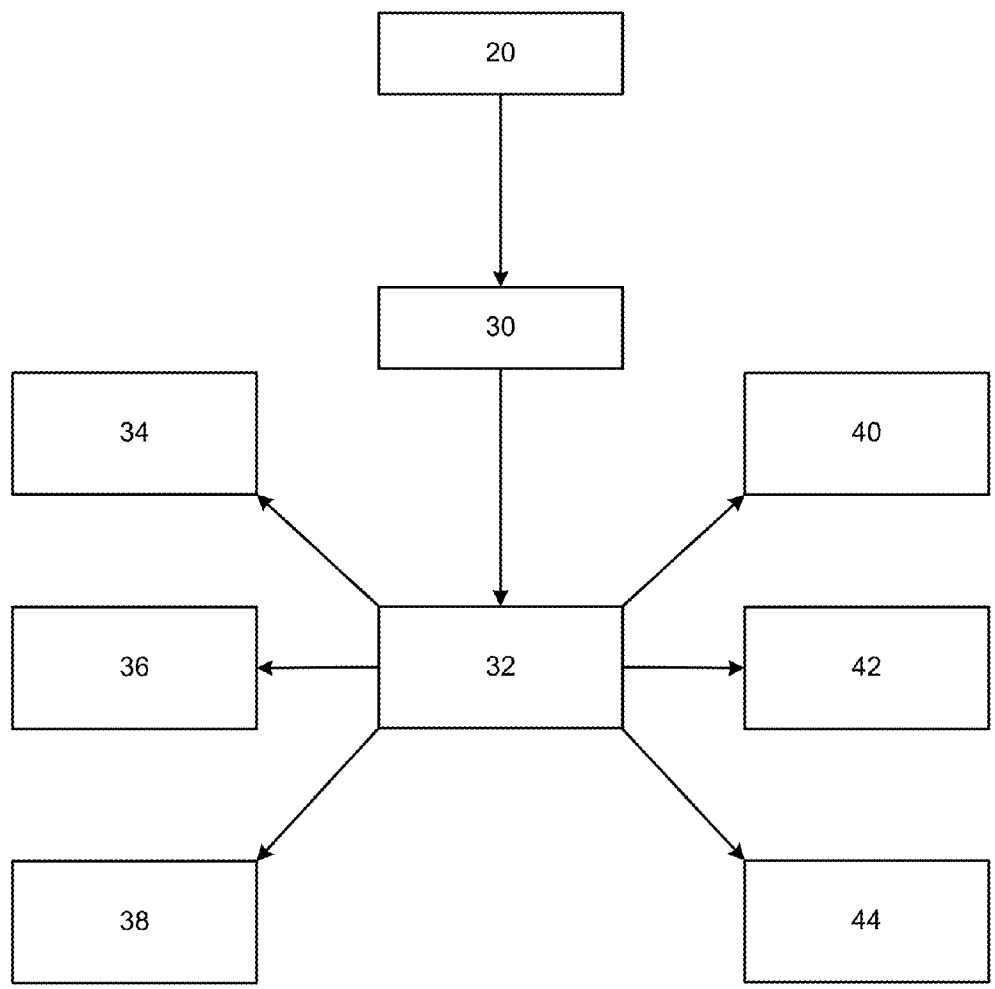
FIG. 2 illustrates a block diagram of a wet road surface detection system.

FIG. 2 illustrates a block diagram of a wet road surface detection system. A plurality of vehicle-based image capture devices 20 are mounted on the vehicle for capturing images around the vehicle. The plurality of vehicle based image capture devices 20 may be mounted on the front, rear, and sides of the vehicle. FIG. 3 illustrates an exemplary 360 degree surround view coverage for detecting objects around the vehicle. Each of the image-based capture devices are cooperatively used to detect and identify objects on each side of the vehicle. The image-based capture devices 20 include, but are not limited to, a front view camera 22 is mounted to a front of the vehicle capturing image forward and partially to the sides of the vehicle. A driver's side camera 24 captures images on the driver side of the vehicle. A passenger's side camera 26 captures images on the passenger side of the vehicle. A rearward facing camera 28 captures images rearward and to the side of the vehicle.

Referring again to FIG. 2, a processor 30 processes the images captured by the image capture devices 20. The processor 30 analyzes images and data to determine whether precipitation is present under a wheel of the vehicle 10. The processor 30 may be part of an existing system, such as traction control system or other system, or can be a stand-alone processor dedicated to analyzing data from the image capture devices 20.

The processor 30 may be coupled to one or more output devices such as a controller 32 for initiating or actuating a control action if precipitation is found on the road surface. One or more countermeasures may be actuated for mitigating the effect that the precipitation may have on the operation of the vehicle.

The controller 32 may be part of the vehicle subsystem or may be used to enable a vehicle subsystem for countering the effects of the water. For example, in response to a determination that the road is wet, the controller 32 may enable an electrical or electro-hydraulic braking system 34 or similar where a braking strategy is readied in the event that traction loss occurs. In addition to preparing a braking strategy, the braking system may autonomously apply a light braking force, without awareness to the driver, to remove precipitation from the vehicle brakes once the vehicle enters the precipitation. Removal of precipitation build-up from the wheels and brakes maintains an expected coefficient of friction between the vehicle brake actuators and the braking surface of the wheels when braking by the driver is manually applied.

The controller 32 may control a traction control system 36 which distributes power individually to each respective wheel for reducing wheel slip by a respective wheel when precipitation is detected on the road surface.

The controller 32 may control a cruise control system 38 which can deactivate cruise control or restrict the activation of cruise control when precipitation is detected on the road surface.

The controller 32 may control a driver information system 40 for providing warnings to the driver of the vehicle concerning precipitation that is detected on the vehicle road. Such a warning actuated by the controller 32 may alert the driver to the approaching precipitation on the road surface and may recommend that the driver lower the vehicle speed to a speed that is conducive to the current environmental conditions, or the controller 32 may actuate a warning to maintain a safe driving distance to the vehicle forward of the driven vehicle. It should be understood that the controller 32, as described herein, may include one or more controllers that control an individual function or may control a combination of functions.

The controller 32 may further control the actuation of automatically opening and closing air baffles 42 for preventing water ingestion into an engine of the vehicle. Under such conditions, the controller 32 automatically actuates the closing of the air baffles 42 when precipitation is detected to be present on the road surface in front of the vehicle and may re-open the air baffles when precipitation is determined to no longer be present on the road surface.

The controller 32 may further control the actuation of a wireless communication device 44 for autonomously communicating the wet pavement condition to other vehicles utilizing a vehicle-to-vehicle or vehicle-to-infrastructure communication system.

The controller may further provide the wet road surface signal alerts to a driver of the vehicle against a use of automated features that include, but are not limited to, Adaptive Cruise Control, Lane Following, Lane Change, Evasive/Assist Maneuver, and Automated Emergency Braking.

The advantage of the techniques described herein is that no excitations are required from the vehicle or driver for initiating a determination of whether water or precipitation is present. That is, prior techniques require some considerable excitation by the vehicle whether by way of a braking maneuver, increased acceleration, steering maneuver so as for surface water detection. Based on the response (e.g., wheel slip, yawing), such a technique determines whether the vehicle is currently driving on water or precipitation. In contrast, the techniques described herein provide a technique that does not require driver excitations for determining precipitation on the road.

Figure 4:
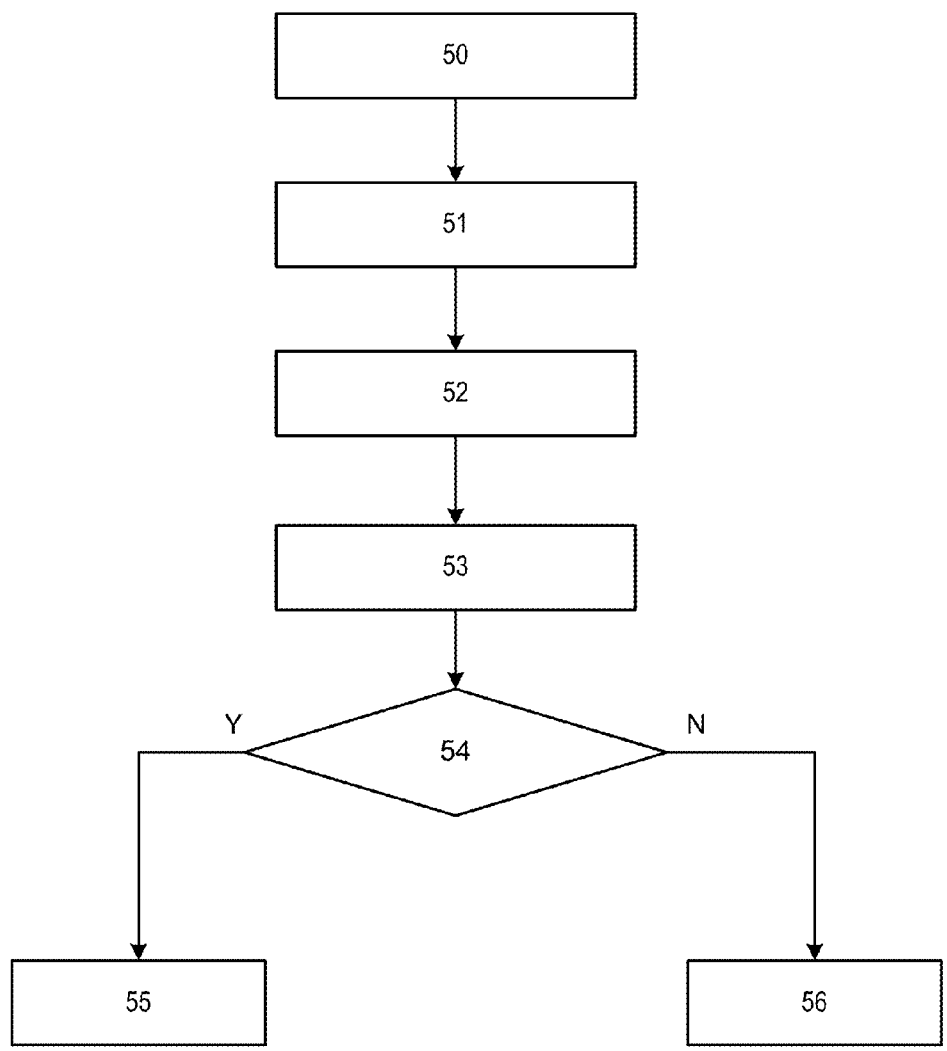
FIG. 4 illustrates a flowchart of a method for detecting a wet surface.
Figure 5:
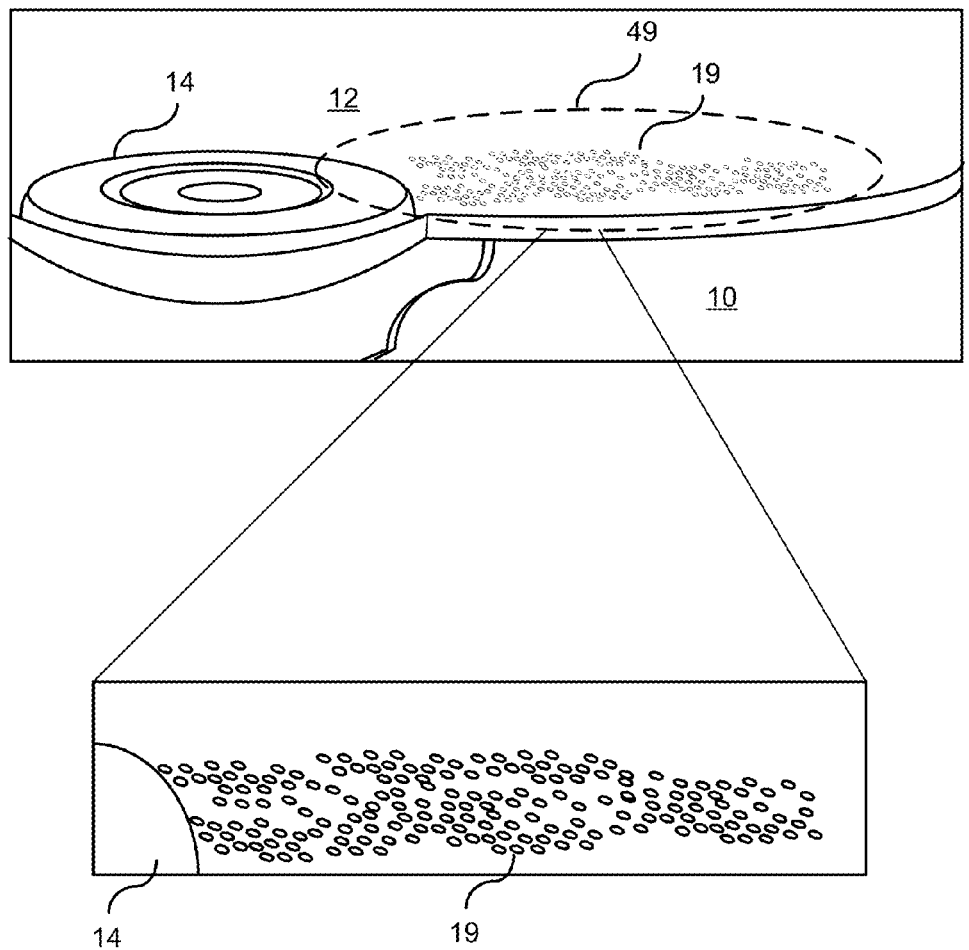
FIG. 5 illustrates an exemplary region of interest from the captured image.

FIG. 4 illustrates a flowchart of a method for detecting a wet surface of the road. In step 50, a sensor/fusion module is provided that obtains scene information where various characteristics in the scene may be analyzed for determining whether precipitation is present in the image. FIG. 5 illustrates an image captured by an image capture device. The image may be processed so that downward view is captured (i.e., looking down at the road of travel). A lens utilized by a respective image capture device may utilize a fisheye lens where a wide field-of-view is captured (e.g., 180 degrees). Image processing may also be applied to change the pose of the camera such that pose as viewed in the image is looking downward. For example, if an image from one of the respective side cameras is utilized, then a respective location in the image may be focused on by generating a virtual pose which renders the scene as if the camera where looking directly downward capturing the wheel 14, the road surface 12, and precipitation 19. To change the pose, a virtual camera model may be used with the captured image such that a virtual pose is utilized to reorient the image so that a virtual image is generated as if the camera is at a different location and facing a different direction (e.g., facing directly downward). Reorienting the image to generate the virtual image includes identifying the virtual pose and mapping of each virtual point on the virtual image to a corresponding point on the real image. The term pose as used herein refers to a camera viewing angle (whether real camera or virtual camera) of a camera location defined by the camera coordinates and the orientation of a camera z-axis. The term virtual camera as used herein is referred to a simulated camera with simulated camera model parameters and simulated imaging surface, in addition to a simulated camera pose. Camera modeling as performed by the processor is described herein as obtaining a virtual image which is a synthesized image of the scene using the virtual camera modeling.

Referring again to FIG. 4, in step 51, a region of interest is identified from the real image or virtual image. This technique localizes the region of interest which identifies a respective region relative where dispersed precipitation is anticipated if rearward splash is present. The region of interest for dispersed precipitation for rearward splash is typically rearward of the wheel opposite of the direction the vehicle is traveling. As shown in FIG. 5, the exemplary region identified by 49 represents region of interest in the image.

Referring again to FIG. 4, in step 52, the region of interest is identified and dispersed precipitation analysis is performed to determine whether precipitation is present on the road surface in the region of interest. This is determined by analyzing whether water droplets are present in the image in the region of interest as a result of water from the road surface being kicked up as the tire rotates. Various techniques can be used for extracting feature which can used later to determine whether an image has an edge formation such as a distinctive edge separating precipitation splashed in the air and a non-splashed area in the image. As a result, edge detection may be performed utilizing a filter, such as an LM filter bank or other image analysis techniques. The LM filter bank is a rotationally invariant set of filters that are used for classifying textures and the direction of the texture in the image. In this example, the LM is multi scale, multi orientation filter bank with a plurality of filters. It may include first and second Gaussian derivative having a respective number of orientations for comparison to the textures of the image. If precipitation splash exists in the region of interest, then pixels in the image will have large values (e.g., large responses of the LM filters) relative to the values on a dry surface. As a result, an absolute mean of the pixel values in the region of interest of the filtered image representing precipitation should be much larger relative to pixels representing non-splash areas (i.e., undisturbed precipitation on the road surface). The filter identifies an edge that distinguishes splash from regions having no splash.

Figure 6:
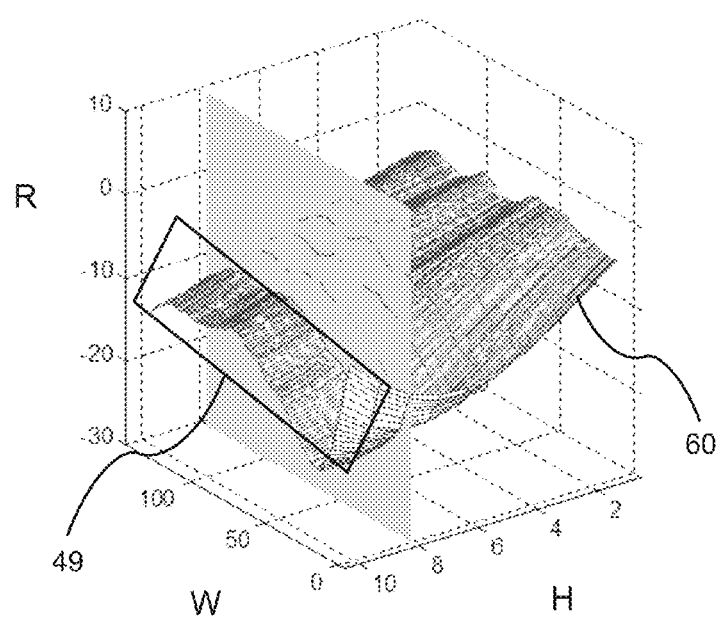
FIG. 6 illustrates an exemplary filter response for the wet road surface.

FIG. 6 illustrates an exemplary filter response 60 on a wet surface. The response graph includes an image width (W) on a first axis and an image height (H) on a second axis. Each pixel within the image is represented by coordinate (W, H). The response (magnitude of the intensity value) is shown on the z-axis for each pixel. As shown in FIG. 6, an area associated with the region of interest 49 with the splash is identified on the graph.

Figure 7:
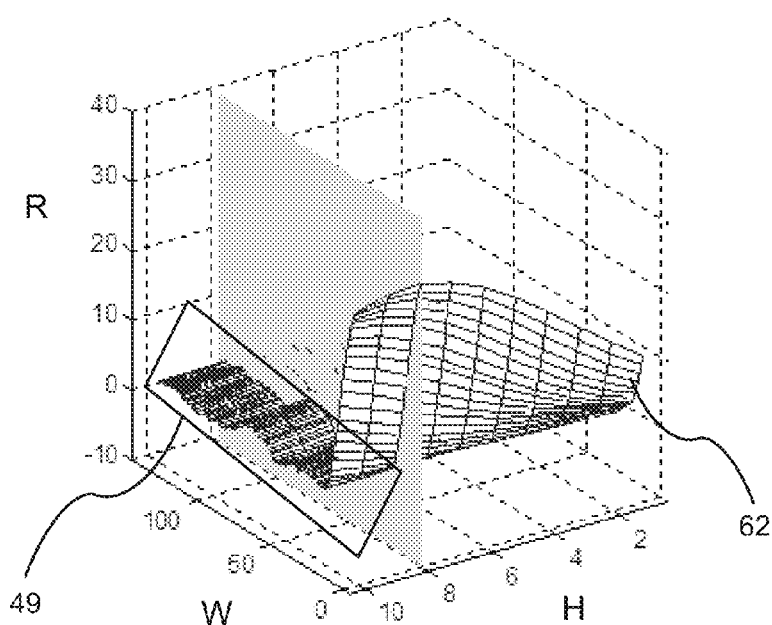
FIG. 7 illustrates an exemplary filter response for a dry road surface.

In contrast FIG. 7 illustrates an exemplary filter 62 response on a dry surface. The response graph includes the image width (W) on the x-axis and the image height (H) on the y-axis. Each pixel within the image is represented by coordinate (W, H). The response (magnitude of the intensity value) is shown on the z-axis. As shown in FIG. 7, the area associated with the region of interest 49 on the dry surface for comparison is shown. The pixel values of the dry surface have a LM filter response of substantially zero. In comparison, the pixels of the wet surface have a LM filter response that is substantially greater (e.g., absolute value) than the filter response of the dry surface.

Figure 8:
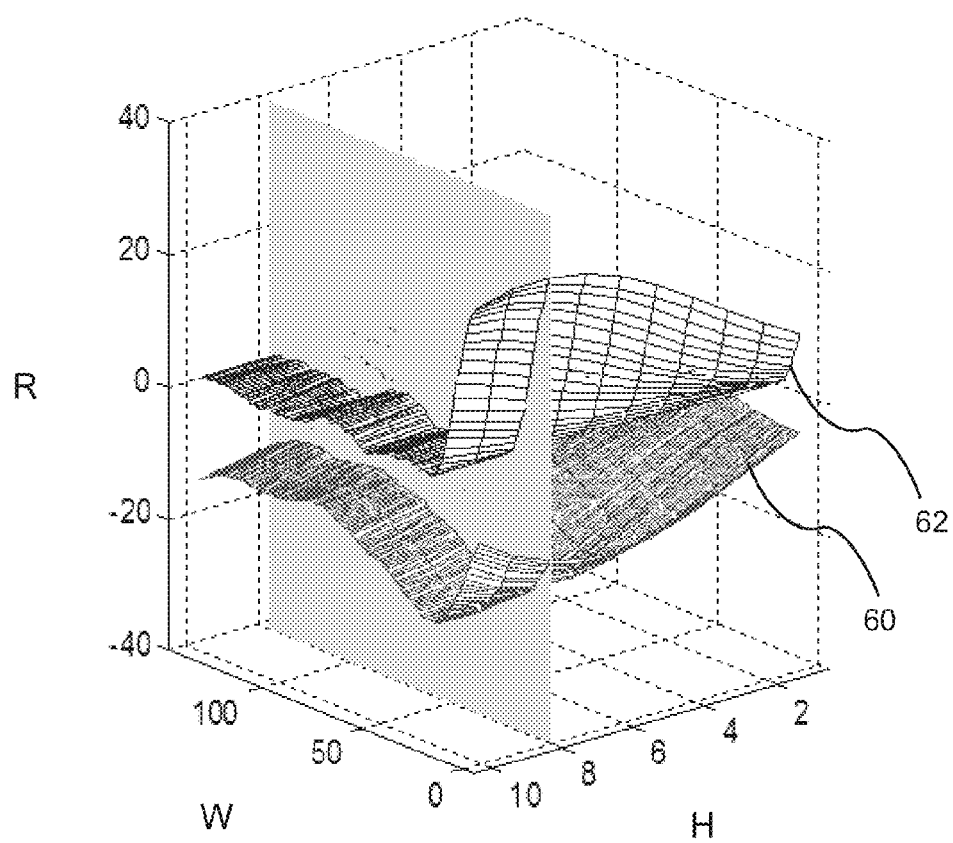
FIG. 8 illustrates an exemplary combined graph showing the filter responses of both the wet and dry surfaces on a same graph.

FIG. 8 illustrates a combined graph showing the filter responses of both the wet and dry surfaces on a same graph. Filter response 60 represents the response on the wet surface whereas filter response 62 represents the response on the dry surface. In comparing the two responses on the same graph the pixel values (absolute) associated with the wet surface are substantially greater than the pixel values associated with the dry surface.

Referring again to FIG. 4, in step 53, feature analysis is applied to the filtered image for identifying pattern matching. Feature analysis is typically trained offline in machine learning which includes feature extraction and feature calculation to build a respective pattern database. After the database is constructed, a classifier is implemented online. During online feature analysis, extracted features are calculated and input to the classifier. The classifier will output a decision as to whether a current surface in the image belongs to a wet or dry surface. As set forth earlier, to apply feature analysis, a multi-scale, multi-orientation LM filter bank is utilizes for feature extraction. For example, an exemplary LM filter bank may include 36 filters using first and second derivatives of Gaussians at 6 orientations and 3 scales. Each filter is applied during a training a classifier trained to generate the pattern database. Alternatively, feature extraction can also be done using other techniques such as deep learning techniques. An average intensity value of the pixels in the region of interest of a respective filtered image will be considered a feature. An intensity value for a respective feature is calculated and is added to the pattern database. When used online, the classifier will determine the feature set based on previously trained classifications. The following formula may be used to determine the feature intensity value which is represented as follows:

$$\text{feature } k = \frac{1}{n} \sum_{i=1}^{N} I_k(i) \quad k = 1, 2, \ldots \ldots 36$$

where N is a total number of pixels in the region of interest of the filtered image from k-th LM filter, and $I_k(i)$ is a pixel value of the i-th pixel of the filtered image from k-th LM filter.

Figure 9:
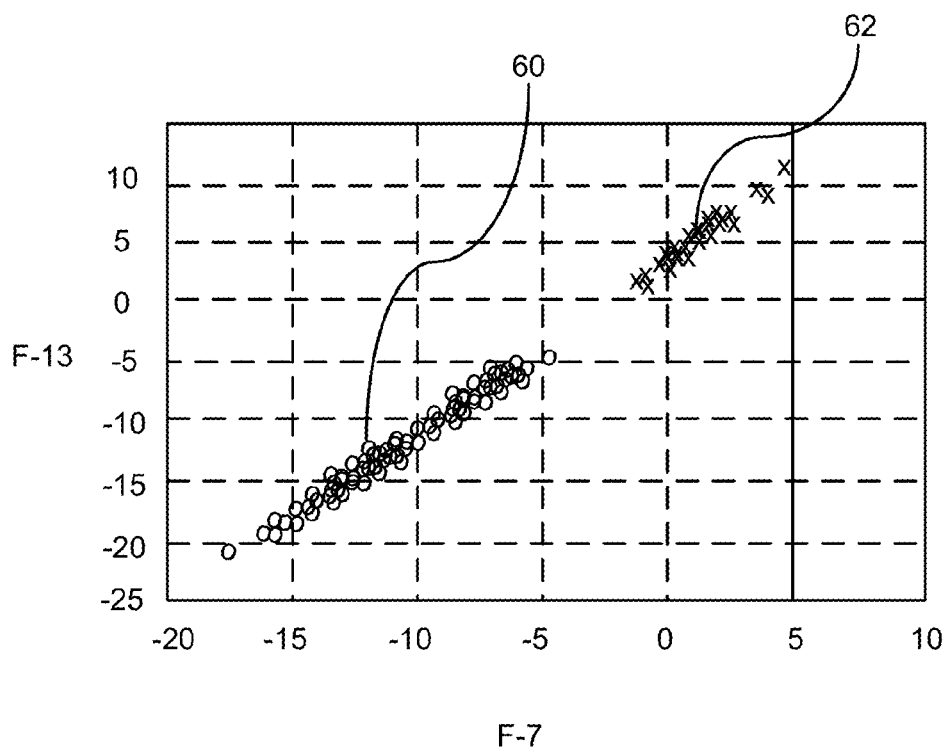
FIG. 9 illustrates an example of validation results.

FIG. 9 illustrates an example of validation results. In this validation test, the vehicle speed was set at 40 mph, and the surface was covered with a respective level of water. Each symbol in FIG. 9 represents a distribution of samples in the feature space. As shown in FIG. 9, the x-axis represents a first feature (F-7), and y-axis represents a second feature (F-13). The features are two first derivative of Gaussians filter with a horizontal orientation and two different scales. The symbol "o" represents a wet surface whereas symbol "x" represents a dry surface. Utilizing a trained classifier, a separation between the distribution of samples in the feature space is clearly distinguished between the first wet surface and the dry surface.

Referring again to FIG. 4, in step 54, a determination is made whether precipitation is present based on the feature analysis. If the determination is made that the precipitation is present, then the routine proceeds to step 55; otherwise, the routine proceeds to step 56.

In step 56, in response to a determination that precipitation is present in the region of interest, a wet surface indicator flagged is set and communicated to a controller where various vehicle operations as described earlier can be actuated that include, but are not limited to, braking control, traction control, speed control, driver warning, air baffle control, and vehicle to vehicle communication.

If the determination was made in step 54 that precipitation was not present in the region of interest, then the routine proceeds to step 56 where other additional techniques may be utilized to verify whether precipitation is present or not.

While certain embodiments of the present invention have been described in detail, those familiar with the art to which this invention relates will recognize various alternative designs, filtering process and embodiments for practicing the invention as defined by the following claims.

What is claimed is:

1. A method for determining a wet surface condition of a road, the method comprising the steps of:
   capturing an image of a road surface by an image capture device of the host vehicle, the image capture device mounted on a side of the host vehicle and capturing an image in a downward direction;
   identifying in the captured image, by a processor, a region of interest rearward of the wheel of the host vehicle, the region of interest representative of where rearward splash as generated by the wheel occurs;
   applying a filter to the region of interest in the image for identifying precipitation, including applying an edge filter for identifying an edge between an area of splash and an area of no splash in the region of interest, wherein applying the edge filter includes applying a texture classification filter, wherein the texture classification filter utilizes an LM filter bank including a plurality of filters having various orientations, wherein the plurality of filters applied to the region of interest assists in identifying edges within the region of interest, wherein a feature analysis is applied to responses from the LM filter bank to determine whether precipitation is present, and wherein a response from the LM filter bank having a magnitude of 0 indicates a no-splash condition;

determining whether precipitation is present in the region of interest; and generating a wet road surface signal in response to the identification of precipitation in the region of interest.

2. The method of claim 1 wherein the LM filter bank are first and second derivatives at predetermined orientations and predetermined sized scales.

3. The method of claim 1 wherein a response from an LM filter having a magnitude with an absolute value that is greater than 0 indicates precipitation.

4. The method of claim 3 wherein a machine learning technique is applied to train an offline classifier utilizing extracted features from a plurality of sample images, wherein the classifier is implemented online within the vehicle to detect edges based on extracted features from feature analysis in determining whether precipitation is present as a function of responses from the edge filter.

5. The method of claim 4 wherein an intensity value of a feature is determined using the following formula:

$$\text{feature } k = \frac{1}{N} \sum_{i=1}^{N} I_k(i) \; k = 1, 2, \ldots 36$$

where N is the total number of pixels in the region of interest of the filtered image that make up the k-th filter, and $I_k(i)$ is a pixel value of the i-th pixel of the filter image k-th LM filter.

6. The method of claim 1 wherein capturing an image in a downward direction includes a real downward image of the road surface.

7. The method of claim 1 wherein capturing an image in a downward direction includes generating a virtual image in a downward direction based on the real image, wherein a virtual image is generated by reorienting the image so that the virtual image is generated as if a camera pose is facing downward.

8. The method of claim 7 wherein reorienting the image to generate the virtual image comprises the steps of:
identifying the virtual pose;
mapping of each virtual point on the virtual image to a corresponding point on the real image.

9. The method of claim 1 wherein the wet road surface signal is provided to a vehicle controller, the controller autonomously actuating vehicle braking for mitigating condensation build-up on vehicle brakes.

10. The method of claim 1 wherein the wet road surface signal is provided to a vehicle controller, the controller autonomously actuating a traction control system for mitigating condensation build-up on vehicle brakes.

11. The method of claim 1 wherein the wet road surface signal is provided to a wireless communication system for alerting other vehicles of the wet road surface condition.

12. The method of claim 1 wherein the wet road surface signal alerts a driver of a potential reduced traction between vehicle tires and the road surface.

13. The method of claim 1 wherein the wet road surface signal alerts a driver of the vehicle against a use of cruise control.

14. The method of claim 1 wherein the wet road surface signal alerts a driver of the vehicle against a use of automated features.

15. The method of claim 14 wherein the wet road surface signal is provided to a vehicle controller, the controller autonomously disabling cruise control.

16. The method of claim 1 wherein the wet road surface signal alerts a driver to reduce a vehicle speed.

17. The method of claim 1 wherein the wet road surface signal is provided to a vehicle controller for shutting baffles on an air intake scoop of a vehicle for preventing water ingestion.

18. The method of claim 1 wherein the wet road surface signal is provided to a vehicle controller, the controller autonomously modifying a control setting of an automated control feature in response to the wet road surface condition.

* * * * *